United States Patent
Mauritz

[11] 3,888,529
[45] June 10, 1975

[54] REAR DOOR LOCK FOR TRUCKS AND TRAILERS

[76] Inventor: Frank A. Mauritz, P.O. Box 9133, Fort Lauderdale, Fla. 33310

[22] Filed: Mar. 11, 1974

[21] Appl. No.: 450,091

[52] U.S. Cl. .................. 292/259; 292/1; 292/288
[51] Int. Cl.² ........................................ E05C 19/18
[58] Field of Search ........ 296/152, 155; 292/1, 259, 292/288, DIG. 32; 105/395

[56] References Cited
UNITED STATES PATENTS

| | | | |
|---|---|---|---|
| 527,043 | 10/1894 | Beck | 292/259 |
| 2,115,241 | 4/1938 | Tomlinson | 292/259 X |
| 2,505,147 | 4/1950 | Scallon | 292/259 X |
| 3,665,736 | 5/1972 | Wilson | 292/259 X |
| 3,801,145 | 4/1974 | Maurity | 296/155 |

Primary Examiner—Richard E. Moor
Attorney, Agent, or Firm—Oltman and Flynn

[57] ABSTRACT

A door lock in the form of a generally U-shaped body of spring steel snugly straddles the back end of a truck or trailer to prevent unauthorized opening of its rear door. Openings in the opposite legs of the door lock snugly receive projections on the sides of the truck or trailer to prevent its removal except by a power-operated apparatus capable of spreading these legs apart.

7 Claims, 5 Drawing Figures

PATENTED JUN 10 1975 3,888,529

REAR DOOR LOCK FOR TRUCKS AND TRAILERS

BACKGROUND OF THE INVENTION

Very substantial economic losses are sustained because of thefts of cargo from parked trucks or trailers. Typically, the thieves gain access to the cargo via the rear doors of the vehicle which often are protected by door locks that can be picked open or broken open readily by experienced thieves.

SUMMARY OF THE INVENTION

The present invention is directed to a novel and improved lock for use on the rear end of a truck, trailer or other cargo-carrying vehicle. It comprises a generally U-shaped body, preferably of spring steel, that is shaped and dimensioned to snugly straddle the rear end of the vehicle for substantially the full height of the rear door. The door lock has interlocks with the sides of the vehicle which cannot be released by using ordinary hand tools, but instead require a power-operated mechanism to effect such release so that the door lock may be removed from the vehicle. In this way, access to the cargo is limited to authorized personnel who have available the power-operated mechanism for disengaging the interlock between the door lock and the sides of the vehicle.

A principle object of this invention is to provide a novel and improved rear door lock for a truck, trailer or similar cargo-carrying vehicle.

Another object of this invention is to provide such a door lock which, as a practical matter, can be removed from the vehicle only with the assistance of a power-operated mechanism and cannot be removed with the usual hand tools used by thieves.

Further objects and advantages of this invention will be apparent from the following detailed description of two presently-preferred embodiments, which are illustrated in the accompanying drawing in which.

Before explaining the present invention in detail, it is to be understood that the invention is not limited in its application to the details of construction and arrangements of parts illustrated in the accompanying drawings, since the invention is capable of other embodiments and of being practiced or carried out in various ways. Also, it is to be understood that the phraseology or terminology employed herein is for the purpose of description and not of limitation.

DETAILED DESCRIPTION

Figure 2:
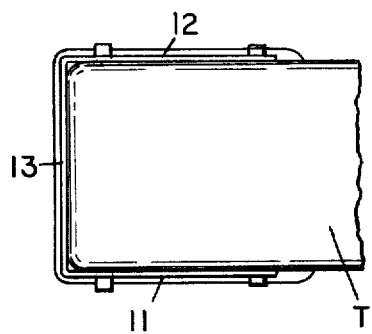
FIG. 2 is a top plan view showing the back end of a trailer with the FIG. 1 door lock applied.
Figure 3:
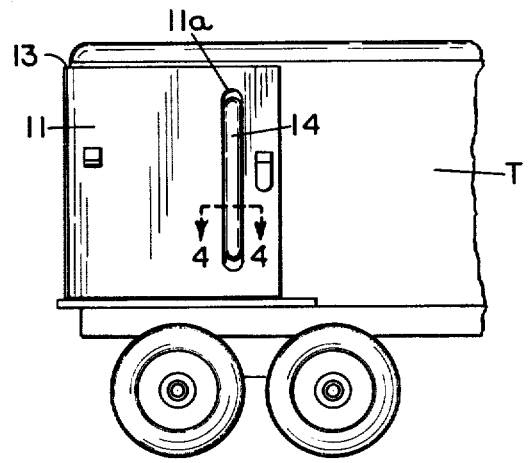
FIG. 3 is a side elevational view of the trailer with this door lock in place.
Figure 4:
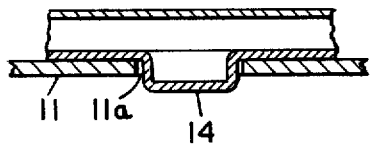
FIG. 4 is an enlarged fragmentary section taken along the line 4—4 in FIG. 3 and showing the interlock between the door lock and the side of the trailer.
Figure 1:
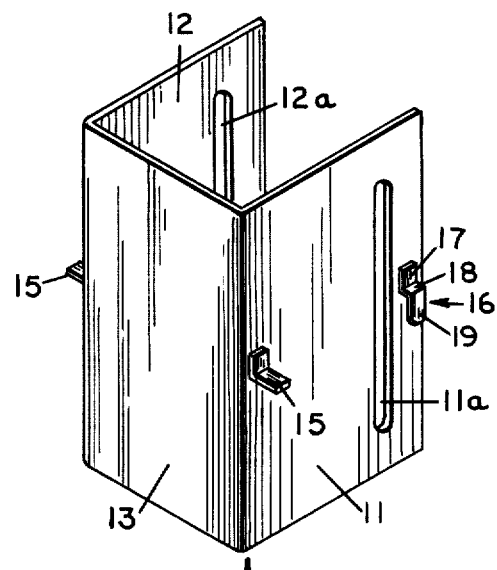
FIG. 1 is a perspective view of a first embodiment of the present door lock.

As shown in FIG. 1, the present door lock comprises a generally U-shaped body 10 of spring steel having parallel, generally flat, opposite legs 11 and 12 and a flat, connecting back wall 13 which extends perpendicular to the legs and is joined integrally to them at their back ends. Both legs 11 and 12 and the back wall 13 extend vertically almost the full height of the trailer or truck vehicle T (FIG. 3) between its floor and its roof.

The door lock is dimensioned to snugly straddle the back end of the vehicle with its back wall 13 extending immediately behind the back door of the vehicle and with its opposite legs 11 and 12 extending forward closely against, and releasably interlocked with, the opposite sides of the vehicle forward from the back door.

In the embodiment shown in FIGS. 1–4, this releasable interlock is provided by vertically elongated openings 11a and 12a in the respective opposite legs 11 and 12 of the door lock, and outwardly-projecting protrusions 14 on the sides of the vehicle which are snugly engaged in these openings when the door lock is in place. The protrusions 14 may be formed integral with the respective sides of the vehicle or they may be suitably attached such as by welding. The legs of the door lock preferably have a slight bias inward toward each other so that they grip the sides of the vehicle resiliently on either side of the protrusions 14.

It will be evident that the massive size of the present door lock imparts enough stiffness to its legs 11 and 12 at their free ends (away from the back wall 13) that they cannot be disengaged from the protrusions 14 by simply using a hand tool such as a crow-bar or the like. Instead, an appropriate hydraulic, pneumatic or electric motor-operated mechanism must be used to spread the free ends of the legs 11 and 12 apart so that the door lock can be pulled back off the vehicle.

Preferably, this removal mechanism comprises a fork lift truck (not shown) having two laterally spaced, forwardly projecting lift arms that may be moved horizontally apart or toward each other selectively by actuating a suitable power operated device. In use, the fork lift truck will be in back of the vehicle T and its lift arms are moved forward horizontally along the outside of the opposite legs 11 and 12 of the door lock. As shown in FIG. 1, on each side the door lock has a rigid L-shaped bracket 15 on the outside near the back. This bracket presents a substantially horizontal segment projecting laterally from the leg and presenting a top surface across which the respective lift arm of the fork lift can slide. Toward its front end, forward beyond the opening 11a or 12a, the respective leg 11 or 12 of the door lock carries another rigid bracket 16, having an upper vertical segment 17 that is welded or otherwise rigidly attached to the outside of the leg, a horizontal segment 18 projecting outward from the lower end of leg 17, and a depending vertical segment 19 spaced outward from and parallel to the respective side 11 or 12 to provide a downwardly-facing recess. The front end of the lift arm on the fork lift passes into this recess under the outwardly projecting segment 18 and between the side of the door lock and the depending leg 19 in bracket 16.

With both fork lift arms positioned in this manner, the power-operated device on the fork lift is actuated to spread apart the front ends of these arms and they, in turn, spread apart the free ends of the legs 11 and 12 on the door lock until the openings 11a and 12a are disengaged from the respective projections 14 on the sides of the vehicle. Now the door lock 10 can be pulled back until it is completely removed from the back end of the vehicle.

Figure 5:
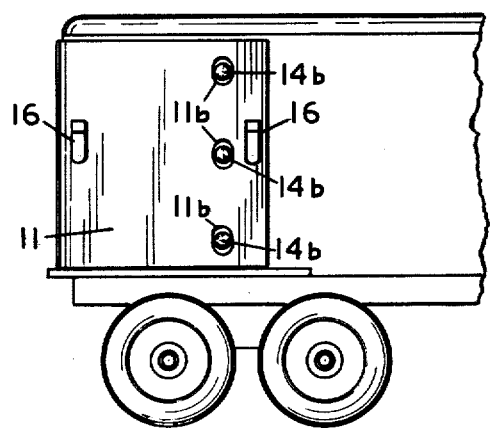
FIG. 5 is a side elevational view of the back end of a trailer with a second embodiment of the present door lock in locking position on it.

FIG. 5 shows an alternative embodiment which differs from the just-described embodiment of FIGS. 1–4 in that both brackets on the sides of the door locks are identical to the bracket 16 in FIG. 1, the single opening in each side of the door lock is replaced by three shorter, vertically spaced openings (as shown at 11b in FIG. 5), and the side of the vehicle T has three projections 14b that are snugly received individually in these openings.

From the foregoing it will be evident that the present door lock is virtually tamper-proof by a thief having only ordinary hand tools. Instead, its removal requires the use of a power-operated device, such as a fork lift truck, for spreading apart the opposite legs 11 and 12 to disengage them from the protrusions 14 on the sides of the vehicle.

The door lock preferably is applied to the vehicle by operating the fork lift in the reverse sequence in which it is used when removing the door lock from the vehicle.

I claim:

1. A rear door lock for a cargo-carrying vehicle, such as a trailer or truck, which has a rear door and opposite sides with protrusions located forward from said rear door, said door lock comprising: a generally U-shaped body of spring steel shaped and dimensioned to snugly straddle the rear end of the vehicle and presenting a back wall to extent immediately behind the rear door on the vehicle and generally parallel opposite legs projecting forward from the opposite ends of said back wall to extend closely along the opposite sides of the vehicle in front of the rear door, said body having a vertical extent of substantially the full height of the rear door on the vehicle, said legs of said body having openings therein toward their front ends for snugly receiving said protrusions on the sides of the vehicle when said back wall of said body extends immediately behind said rear door on the vehicle, whereby to releasably lock said body to the sides of the vehicle, and brackets on the outside of said opposite legs of the generally U-shaped body, said brackets having respective depending segments which are offset laterally outward from said legs so as to receive slidably between them the lift arms of a fork lift truck which are spreadably apart substantially to pull said legs apart and thereby disengage said openings from said protrusions.

2. A door lock according to claim 1, wherein said brackets are located in front of the respective openings in the opposite legs of the generally U-shaped body.

3. A door lock according to claim 1, wherein said brackets are located in front of and behind the respective openings in the opposite legs of the generally U-shaped body.

4. A door lock according to claim 2, and further comprising an additional bracket on the outside of each leg of the generally U-shaped body rearward from the opening therein, said additional bracket presenting an upwardly-facing surface for engagement beneath the respective lift arm on the fork lift truck.

5. A rear door lock for a cargo-carrying vehicle, such as a trailer or truck, which has a rear door and opposite sides with protrusions located forward from said rear door, said door lock comprising: a generally U-shaped body shaped and dimensioned to snugly straddle the rear end of the vehicle and presenting a back wall to extend immediately behind the rear door on the vehicle and generally parallel opposite legs projecting forward from the opposite ends of said back wall to extend closely along the opposite sides of the vehicle in front of the rear door, said legs of said body having openings therein toward their front ends for receiving the protrusions on the respective sides of the vehicle when said back wall of said body is positioned immediately behind the rear door of the vehicle, whereby to releasably lock said body to the sides of the vehicle, and a bracket on the outside of each of said legs in front of the opening therein, each bracket having a segment extending down from the outer end of said outwardly-projecting segment to provide a downwardly-facing recess for slidably receiving the lift arm of a fork lift truck.

6. A door lock according to claim 5, and further comprising an additional bracket on the outside of each leg located rearward from the opening therein, said additional bracket projecting outward from said leg and presenting an upwardly-facing surface for engagement beneath the respective lift arm.

7. A door lock according to claim 5, and further comprising an additional bracket on the outside of each leg rearward from the opening therein, said additional bracket having a segment projecting outward from said leg and depending segment extending down from the outer end of said outwardly-projecting segment to provide a downwardly-facing recess for slidably receiving the respective lift arm.

* * * * *